(12) United States Patent
Kim et al.

(10) Patent No.: US 8,477,152 B2
(45) Date of Patent: Jul. 2, 2013

(54) SYSTEM AND METHOD FOR DRAWING STREAM AND ROAD CENTERLINE FOR GIS-BASED LINEAR MAP PRODUCTION

(75) Inventors: Kye Hyun Kim, Incheon (KR); Se Uk Cheon, Chungbuk (KR); Hyuk Lee, Incheon (KR); Chol Young Lee, Gyeonggi-do (KR); Yong Gil Park, Incheon (KR)

(73) Assignees: Geum River Water Conservancy, Daejeon (KR); Inha-Industry Partnership Institute, Incheon (KR)

( * ) Notice: Subject to any disclaimer, the term of this patent is extended or adjusted under 35 U.S.C. 154(b) by 429 days.

(21) Appl. No.: 12/805,543

(22) Filed: Aug. 5, 2010

(65) Prior Publication Data
US 2011/0157220 A1    Jun. 30, 2011

(30) Foreign Application Priority Data
Dec. 24, 2009    (KR) .................. 10-2009-0130429

(51) Int. Cl.
*G09G 5/00*    (2006.01)

(52) U.S. Cl.
USPC .......................................... 345/619

(58) Field of Classification Search
None
See application file for complete search history.

(56) References Cited

U.S. PATENT DOCUMENTS 5,848,375 A * 12/1998 Nunobiki et al. ............. 701/455
2005/0024361 A1* 2/2005 Ikeda et al. .................. 345/441

* cited by examiner

*Primary Examiner* — Hau Nguyen
*Assistant Examiner* — Ryan M Gray
(74) *Attorney, Agent, or Firm* — Bacon & Thomas, PLLC

(57) ABSTRACT

Disclosed herein is a system and method for drawing a stream and road centerline for GIS-based linear map production, which performs a series of processes of automatically detecting accurate positions of points of a centerline using contour line data of a stream map or a road map having a digital map form, which is extracted from a digital map produced through remote sensing or construction of national geographic information systems, and connecting the detected points of the centerline so as to update stream and road centerline data generated by an inaccurate method and algorithm and to enable an accurate centerline to be used in various application fields.

2 Claims, 19 Drawing Sheets

SYSTEM AND METHOD FOR DRAWING STREAM AND ROAD CENTERLINE FOR GIS-BASED LINEAR MAP PRODUCTION

BACKGROUND OF THE INVENTION

1. Field of the Invention

The present invention relates to a system and method for drawing a stream and road centerline for Geographic Information System (GIS)-based linear map production, and, more particularly, to a system and method for drawing a stream and road centerline for GIS-based linear map production, which performs a series of processes of automatically detecting accurate positions of points on a centerline using contour line data of a stream map or a road map having a digital map form, which is extracted from a digital map produced through remote sensing or construction of national geographic information systems, and connecting the detected points of the centerline so as to update stream and road centerline data generated by an inaccurate method and algorithm of the related art and to enable an accurate centerline to be used in various application fields.

2. Description of the Related Art

As known, in a current system used in a computer, in order to produce or update a small-scale map using a large-scale map, linear targets such as streams or roads need to be generalized from a polygon to a line, due to a limit in target size capable of being expressed in the small-scale map.

Therefore, various methods or algorithms for generalization have been developed. However, since the centerline of each object which is drawn when the large-scale map is produced is used in the linear expression of the small-scale map without change or with change, the drawing of the accurate centerline when the large-scale map is produced is of importance.

In addition, recently, a linear map is applied to a GIS technology so as to be widely used in many application fields. A stream centerline is used as reference data in water-flow distance calculation, network analysis, stream shape change sensing and monitoring, water quality simulation section determination, and a road centerline is used as reference data in distance and required time calculation of vehicle navigation and optimal route determination. The applicability of the linear map has been gradually increased.

However, the existing stream or road centerline is not drawn so as to accurately pass through a central portion accurately corresponding to half of the width of an object, but is drawn so as to pass through a substantially central portion of an object by qualitative judgment or a personal criterion of a mapper. That is, since the existing stream or road centerline is not drawn based on a strict criterion, there is a limit in that the existing stream or road centerline is used as reference data of the accurate analysis or use. In addition, the existing stream or road centerline may cause an unintended result.

SUMMARY OF THE INVENTION

Therefore, the present invention has been made in view of the above problems, and it is an object of the present invention to provide a system and method for drawing a stream and road centerline for GIS-based linear map production, which performs a series of processes of automatically detecting accurate positions of points of a centerline using contour line data of a stream map or a road map having a digital map form, which is extracted from a digital map produced through remote sensing or construction of national geographic information systems, and connecting the detected points of the centerline so as to update stream and road centerline data generated by an inaccurate method and algorithm of the related art and to enable an accurate centerline to be used in various application fields.

In accordance with the present invention, the above and other objects can be accomplished by the provision of a system for drawing a stream and road centerline based on a Geographic Information System (GIS), the system including: a system main module configured to drive the system for drawing the stream and road centerline necessary for accurate GIS-based linear map production; a spatial database in which a graphic database for storing a plurality of pieces of graphic data, in which positional information of points of a stream and road contour line is stored in the form of a digital map, is established; a centerline vertex position automatic detecting and storing module included in the system main module and configured to perform a preprocessing process of retrieving data of a region where centerline drawing is necessary, to automatically detect the positions of points, through which the centerline passes, and potential vertexes which will be included in the centerline in the future, and to extract and store the positional information of the points in the form of a digital map; a centerline drawing, editing and storing module included in the system main module and configured to draw and edit the centerline using the positional information of the vertexes processed by the centerline vertex position automatic detecting and storing module and to store the centerline as a linear map; and a display unit configured to display the result of drawing the centerline using the system on a screen, wherein the centerline vertex position automatic detecting and storing module performs the preprocessing procedure of retrieving a stream or road map stored in the spatial database and transforming the stream or road map into data usable by the module, includes an algorithm for detecting a maximum inscribed circle of the points which are the positions of the potential vertexes of the centerline, and a center point of the maximum inscribed circle, transforms the extracted positional information of the potential vertexes into a digital map, and stores the digital map, and wherein the centerline drawing, editing and storing module retrieves the vertexes extracted and stored by the centerline vertex position automatic detecting and storing module, performs snapping configuration for detecting the accurate positions of the vertexes based on the GIS and configuration for generating a new linear graphic, confirms and selects the positions of the vertexes extracted in a GIS-based environment, linearly connects and edits the vertexes, and stores the final result of connecting the centerlines as a linear digital map file.

In accordance with an aspect of the present invention, the above and other objects can be accomplished by the provision of a method for drawing a stream and road centerline based on a Geographic Information System (GIS), the method including: extracting stream and road map data of a region when a selection signal for the region, map production of which is necessary, is applied; transforming the map data into editable data; detecting a maximum inscribed circle of points which are the positions of potential vertexes of a centerline and a center point thereof; transforming positional information of the extracted potential vertexes into a digital map; performing snapping configuration for detecting the accurate positions of the vertexes and configuration for generating a new linear graphic; linearly connecting the positions of the extracted vertexes and the centerline; and storing the final result of connecting the centerline as a linear digital map file.

According to a system and method for drawing a stream and road centerline for GIS-based linear map production of the present invention, it is possible to remarkably improve an existing process of drawing a centerline of a stream and road with low accuracy and considerable time which is consumed in producing and updating a map using the centerline of the stream and road. By generating accurate centerline data for a short period of time, it is possible to produce a small-scale map that closely approximates reality and to easily update map data. Further, the system and method according to the present invention can be variously used in practical fields such as spatial analysis research such as accurate network analysis using accurate linear data of a stream and road and distance calculation, shape change detecting and monitoring research, or other scientific research fields.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described in detail with reference to the accompanying drawings.

Figure 1:
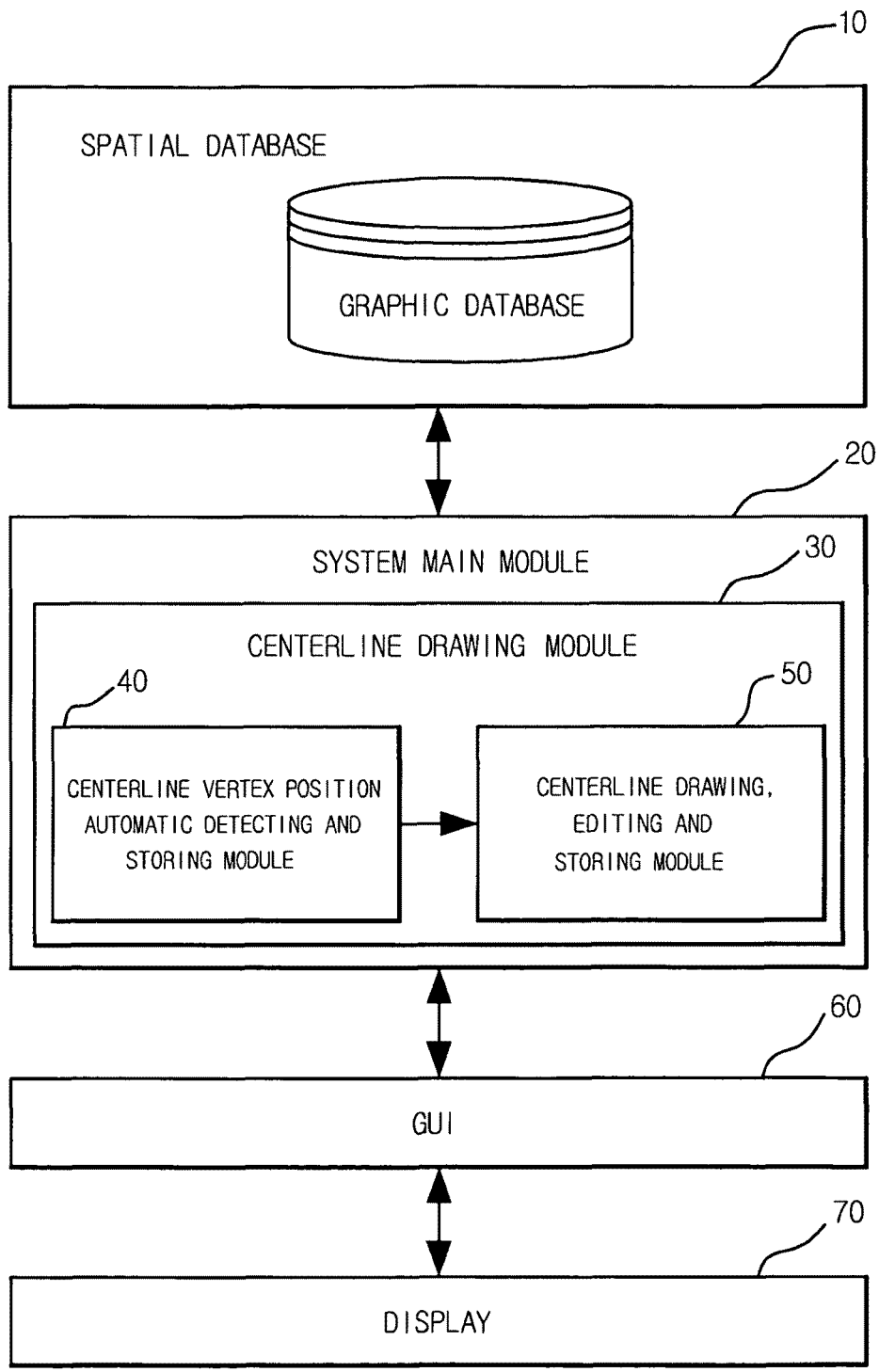
FIG. 1 is a block diagram showing the configuration of a system for drawing a stream and road centerline for GIS-based linear map production according to an embodiment of the present invention.
Figure 2:
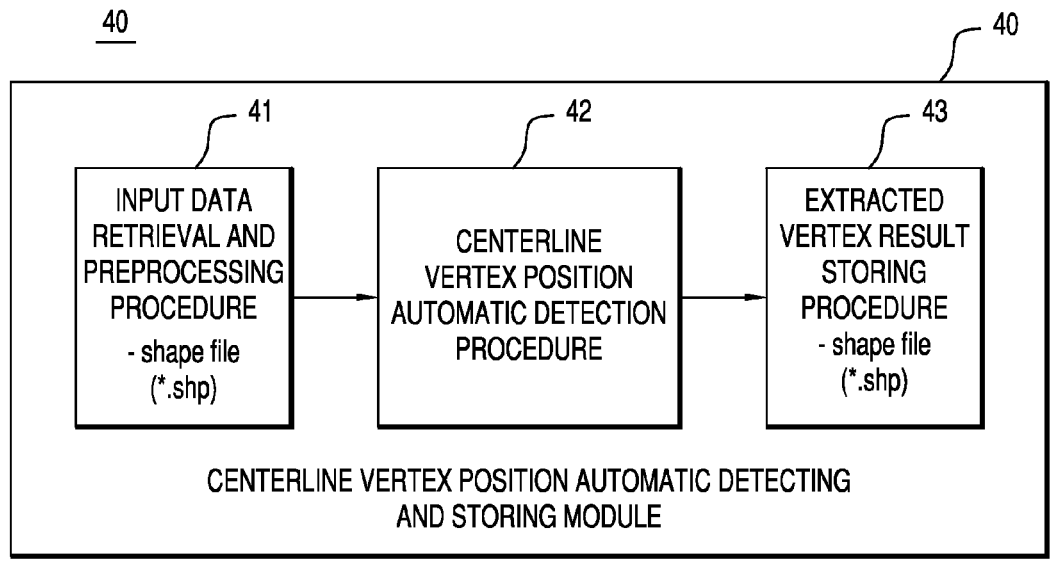
FIG. 2 is a block diagram showing a process of automatically detecting the positions of vertexes, through which a centerline passes, and storing the detection result, in the system for drawing the stream and road centerline for GIS-based linear map production according to the embodiment of the present invention.
Figure 3:
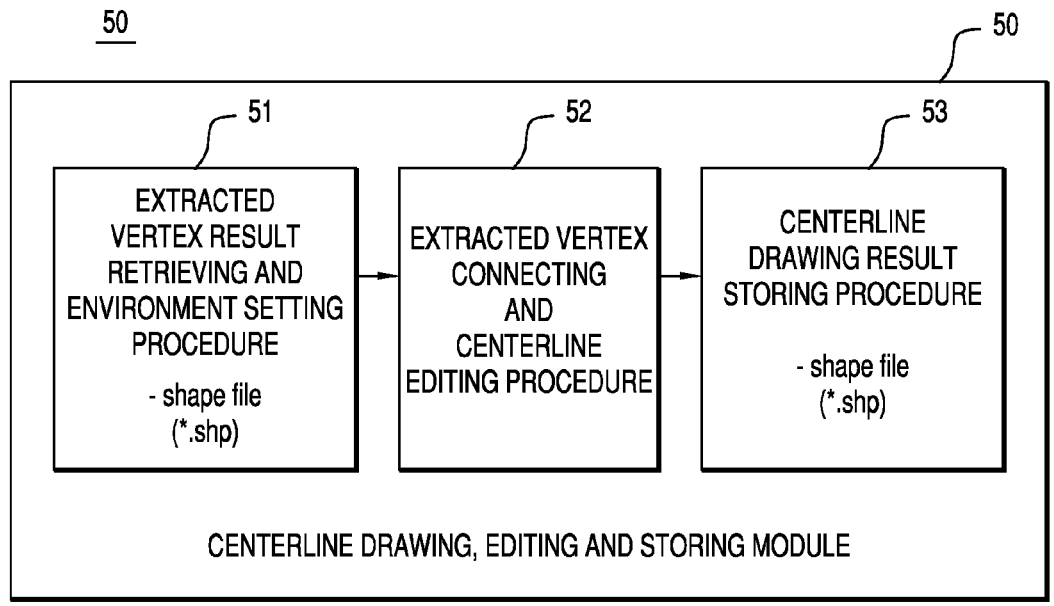
FIG. 3 is a block diagram showing a process of connecting the stored vertexes, drawing and editing the centerline, and storing the result, in the system for drawing the stream and road centerline for GIS-based linear map production according to the embodiment of the present invention.

FIG. 1 is a block diagram showing the configuration of a system for drawing a stream and road centerline for GIS-based linear map production according to an embodiment of the present invention, FIG. 2 is a block diagram showing a process of automatically detecting the positions of vertexes, through which a centerline passes, and storing the detection result, in the system for drawing the stream and road centerline for GIS-based linear map production according to the embodiment of the present invention, FIG. 3 is a block diagram showing a process of connecting the stored vertexes, drawing and editing the centerline, and storing the result, in the system for drawing the stream and road centerline for GIS-based linear map production according to the embodiment of the present invention.

The system for drawing the stream and road centerline for GIS-based linear map production according to the embodiment of the present invention performs a series of processes of automatically detecting accurate positions of points of a centerline using contour line data of a stream map or a road map having a digital map form, which is extracted from a digital map produced through remote sensing or construction of national geographic information systems, and connecting the detected points of the centerline so as to update stream and road centerline data generated by an inaccurate method and algorithm of the related art and to enable an accurate centerline to be used in various application fields.

In more detail, in the system for drawing the stream and road centerline for GIS-based linear map production according to the embodiment of the present invention, a spatial database is established and potential vertexes included in a centerline are extracted by a centerline vertex position automatic detecting and storing module, thereby producing an accurate linear map.

In the system for drawing the stream and road centerline for GIS-based linear map production according to the embodiment of the present invention, a system main module 20 is electrically connected to a Graphical User Interface (hereinafter, referred to as "GUI") 60, a spatial database 10 composed of a graphic database according to the present invention is included and is electrically connected to the system main module 20, and a display unit 70 for displaying a result on a screen so as to enable a user to check the result is electrically connected to the GUI 60.

The system main module 20 sequentially performs a series of processes of drawing a stream and road centerline, and includes a centerline drawing integration module 30 to draw a centerline. The centerline drawing integration module 30 includes a centerline vertex position automatic detecting and storing module 40 and a centerline drawing, editing and storing module 50, and draws the centerline using these modules.

The centerline vertex position automatic detecting and storing module 40 is connected to the centerline drawing, editing and storing module 50 such that the result of the centerline vertex position automatic detecting and storing module 40 is processed by the centerline drawing, editing and storing module 50.

In more detail, the centerline vertex position automatic detecting and storing module 40 is included in the centerline drawing integration module 30, and is responsible for performing a preprocessing procedure of retrieving map data requiring centerline drawing and transforming the map data into editable data, automatically detecting accurate positions of points, through which the centerline passes, or potential vertexes which will be included in the centerline in the future, and extracting and storing positional information of the points in the form of a digital map.

The centerline drawing, editing and storing module 50 is included in the centerline drawing integration module 30, and is responsible for drawing and editing the centerline using the positional information of the vertexes stored in the centerline vertex position automatic detecting and storing module 40 and storing the centerline as a linear map.

In more detail, the centerline vertex position automatic detecting and storing module 40 performs an input data retrieving and preprocessing procedure of retrieving a stream map or a road map from the graphic database included in the spatial database 10 and transforming the stream map or the road map into a data format capable of being used in the module.

Next, the centerline vertex position automatic detecting and storing module 40 detects a maximum inscribed circle and a central point with respect to each of the points, which are positions of the potential vertexes of the centerline, so as to automatically detect the vertex positions of the centerline, transforms the positional information of the previously extracted potential vertexes into a digital map, and stores the digital map for use by the centerline drawing, editing and storing module 50.

The centerline drawing, editing and storing module 50 retrieves the result of storing the vertexes extracted by the centerline vertex position automatic detecting and storing module 40, performs snapping configuration for detecting the accurate positions of the vertexes based on the GIS and configuration for generating a linear graphic, confirms and selects the accurate positions of the extracted vertexes in the GIS-based environment, linearly connects and edits the vertexes, and stores the final result of connecting the centerline as a digital map file.

The process of drawing the centerline using the system for drawing the stream and road centerline for GIS-based linear map production according to the embodiment of the present invention will be described in detail with reference to the accompanying drawings.

At this time, the system for drawing the stream and road centerline for GIS-based linear map production according to the embodiment of the present invention includes the spatial database 10 including the graphic database.

The graphic database included in the spatial database 10 includes various thematic maps in the form of digital maps necessary for centerline drawing and stores the stream or road maps of the whole country as basic maps for extracting a target, the centerline of which will be drawn.

The system main module 20 is designed to extract and output data stored in the spatial database 10 on a screen and to draw the centerline. The detection of the potential vertexes included in the centerline and the drawing of the centerline are performed by the centerline vertex position automatic detecting and storing module 40 and the centerline drawing, editing and storing module 50.

Figure 6:
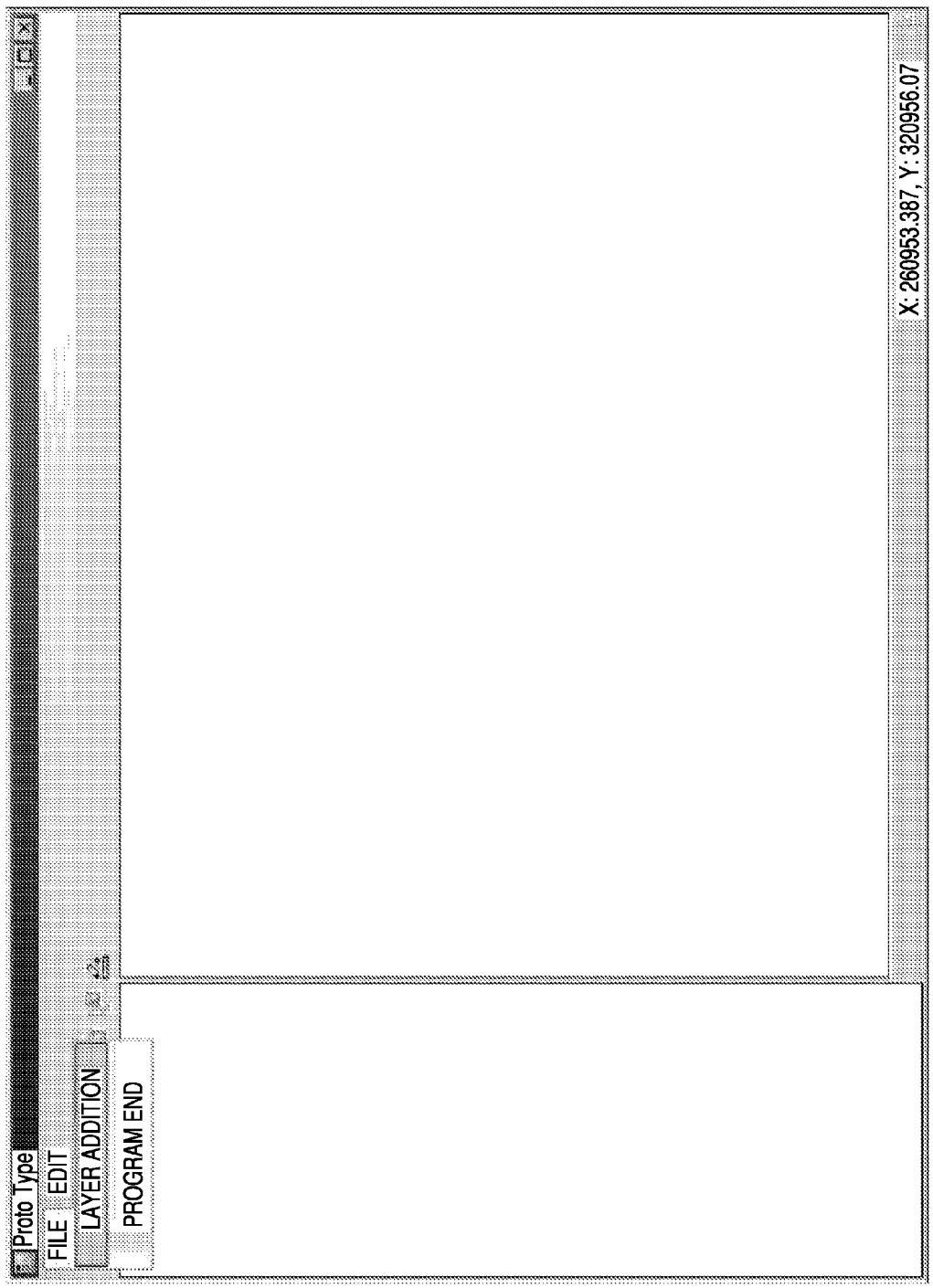
FIG. 6 is a diagram showing a menu used to retrieve the content of a spatial database and to read the retrieved result, in the system for drawing the stream and road centerline for GIS-based linear map production according to the embodiment of the present invention.
Figure 7:
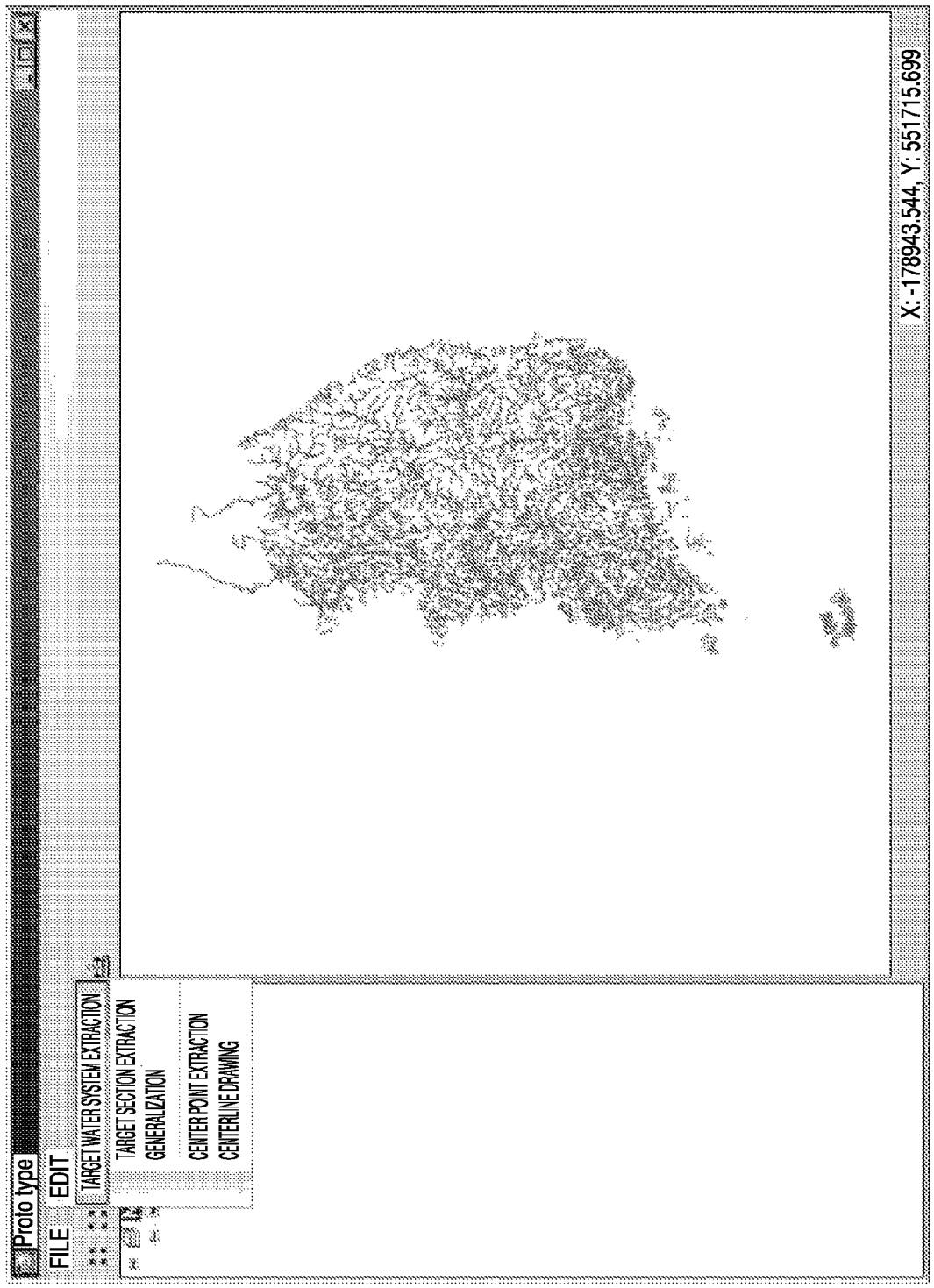
FIG. 7 is a diagram showing a menu used to extract input data in order to automatically detect the positions of the vertexes, through which the centerline passes, in the system for drawing the stream and road centerline for GIS-based linear map production according to the embodiment of the present invention.

Referring to FIG. 2, the process of extracting the potential vertexes included in the centerline is started by an input data retrieval and preprocessing procedure 41 in the centerline vertex position automatic detecting and storing module 40. The input data retrieval and preprocessing module 41 is driven by a simple menu window provided by the GUI. FIGS. 6 and 7 show an embodiment of an execution menu window in the system for performing the input data retrieval and preprocessing procedure.

As shown in FIGS. 6 and 7, in the execution menu window for drawing the centerline, layer addition functioning as a menu for selecting a centerline extraction target and center point extraction for extracting the potential vertexes included in the centerline are included. The centerline extraction target is selected by the layer addition, and an algorithm for extracting the vertexes, through which the centerline passes, is performed with respect to the selected centerline extraction target so as to extract the potential vertexes included in the centerline through center point extraction.

FIG. 6 is a diagram showing a menu used to retrieve the content of a spatial database and to read the retrieval result, in the system for drawing the stream and road centerline for GIS-based linear map production according to the embodiment of the present invention, and FIG. 7 is a diagram showing a menu used to extract input data in order to automatically detect the positions of the vertexes, through which the centerline passes, in the system for drawing the stream and road centerline for GIS-based linear map production according to the embodiment of the present invention.

Figure 8:
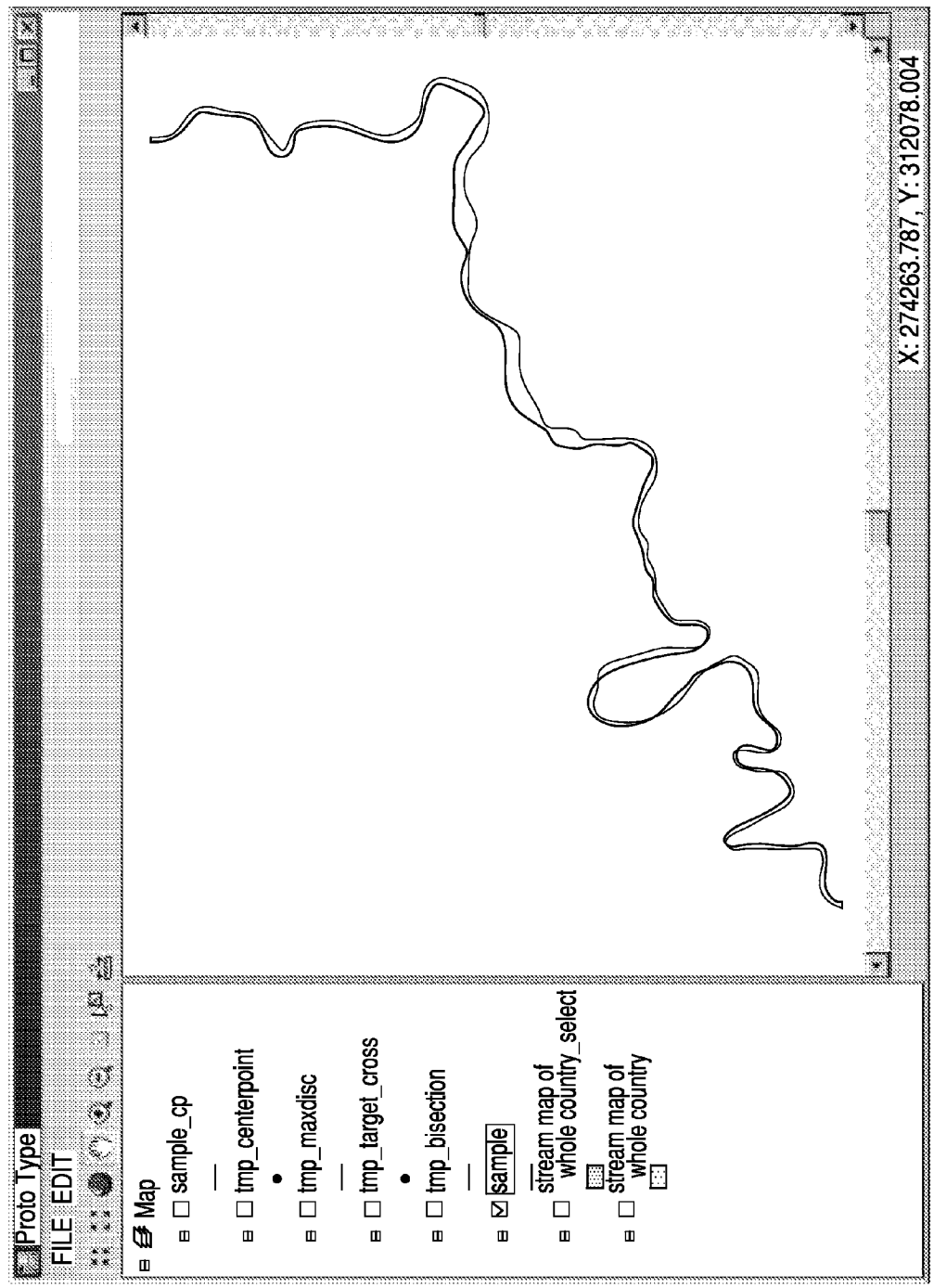
FIG. 8 is a diagram showing a result of transforming a polygon type target section into a line type in order to acquire contour line vertex data of a certain section, in the system for drawing the stream and road centerline for GIS-based linear map production according to the embodiment of the present invention.

Referring to FIGS. 6, 7 and 8, the input data retrieval and preprocessing procedure 41 is started by the menu "layer addition" in the system main module 20. The input data retrieval and preprocessing procedure 41 is driven by a simple menu window provided by the GUI. FIG. 8 is a diagram showing a result of specifying a target section, the centerline of which is desired to be drawn, as a preprocessing procedure for a certain stream map, in the system for drawing the stream and road centerline for GIS-based linear map production according to the embodiment of the present invention.

The input data retrieval and preprocessing procedure 41 is subjected to a target water system extracting process, a target section extracting process and a generalizing process. First, in the target water system extracting process, input data is retrieved and necessary data is read from the associated database 10. In the embodiment of the present invention, the layers of the stream maps of the whole country are read, any one of the water systems is selected, and the selected water system is stored.

Next, in the target section extracting process, a target section, the centerline of which is desired to be extracted, is selected from the stored water system, is merged to one polygon, and is subjected to the generalization process if necessary, thereby obtaining the target section from which unnecessary stream vertexes are removed. The selected target section is stored in a shape file as the result of the input data retrieval and preprocessing procedure 41.

A centerline vertex position automatic detection procedure 42 is started by the center point extraction menu shown in FIG. 7. In the embodiment of the present embodiment, the centerline of the stream is extracted from a certain stream included in a certain water system shown in FIG. 8.

Figure 9:
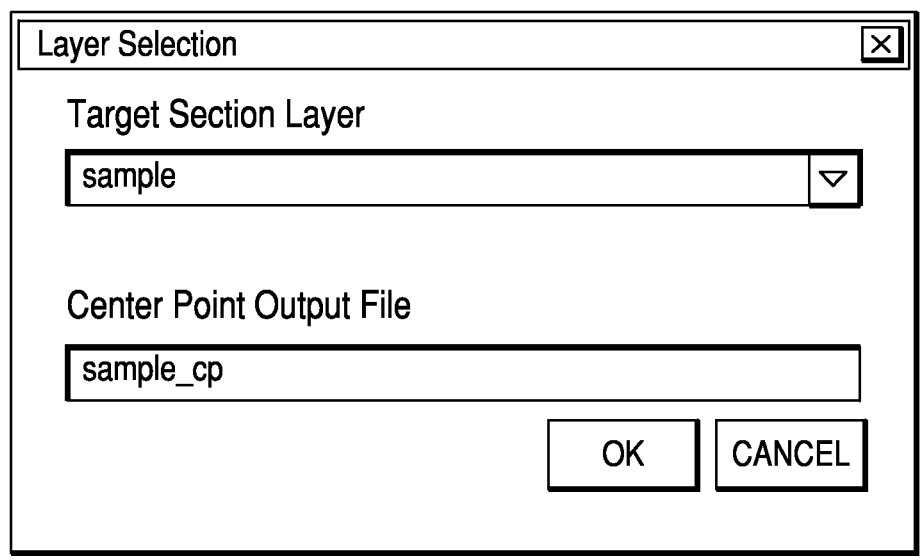
FIG. 9 is a diagram showing an input data and result data input window for automatically detecting the positions of the vertexes, through which the centerline passes, in the system for drawing the stream and road centerline for GIS-based linear map production according to the embodiment of the present invention.

FIG. 9 is a diagram showing an input data and result data input window for automatically detecting the positions of the vertexes, through which the centerline passes, in the system for drawing the stream and road centerline for GIS-based linear map production according to the embodiment of the present invention.

The input window of FIG. 9 is configured to input a target layer for detecting the vertex positions of the centerline and a layer for storing the result. When a target section layer combo box is selected, a list of currently read layers can be confirmed. The name of a shape file in which the result will be stored can be input to a center point output file text box. If the input is completed, it is possible to confirm the result of performing the centerline vertex position automatic detection procedure 42 on a main screen.

Figure 4A:
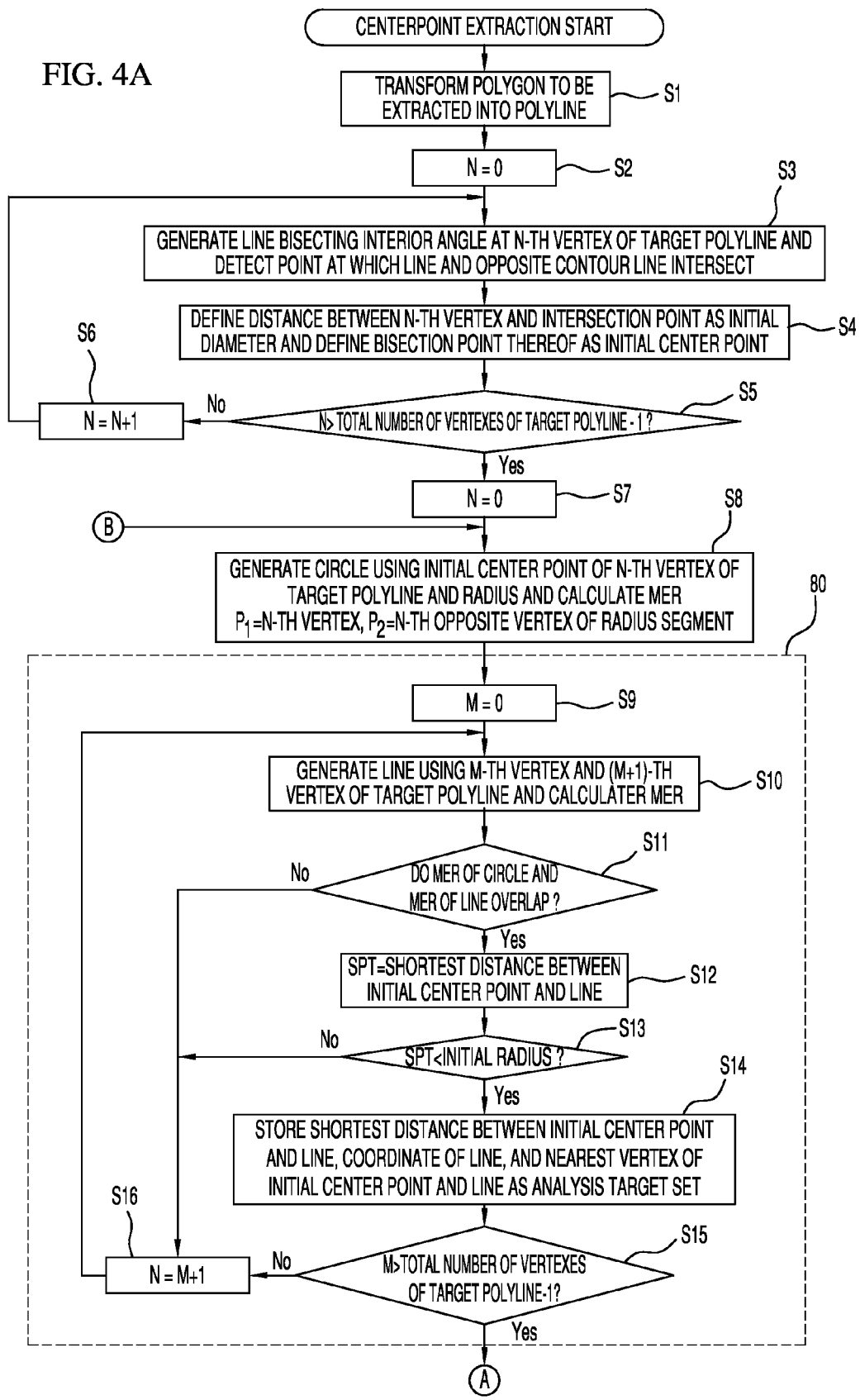
FIGS. 4A and 4B are flowcharts illustrating an algorithm for automatically detecting the positions of vertexes, through which the centerline passes, and storing the detection result, in the system for drawing the stream and road centerline for GIS-based linear map production according to the embodiment of the present invention.
Figure 4B:
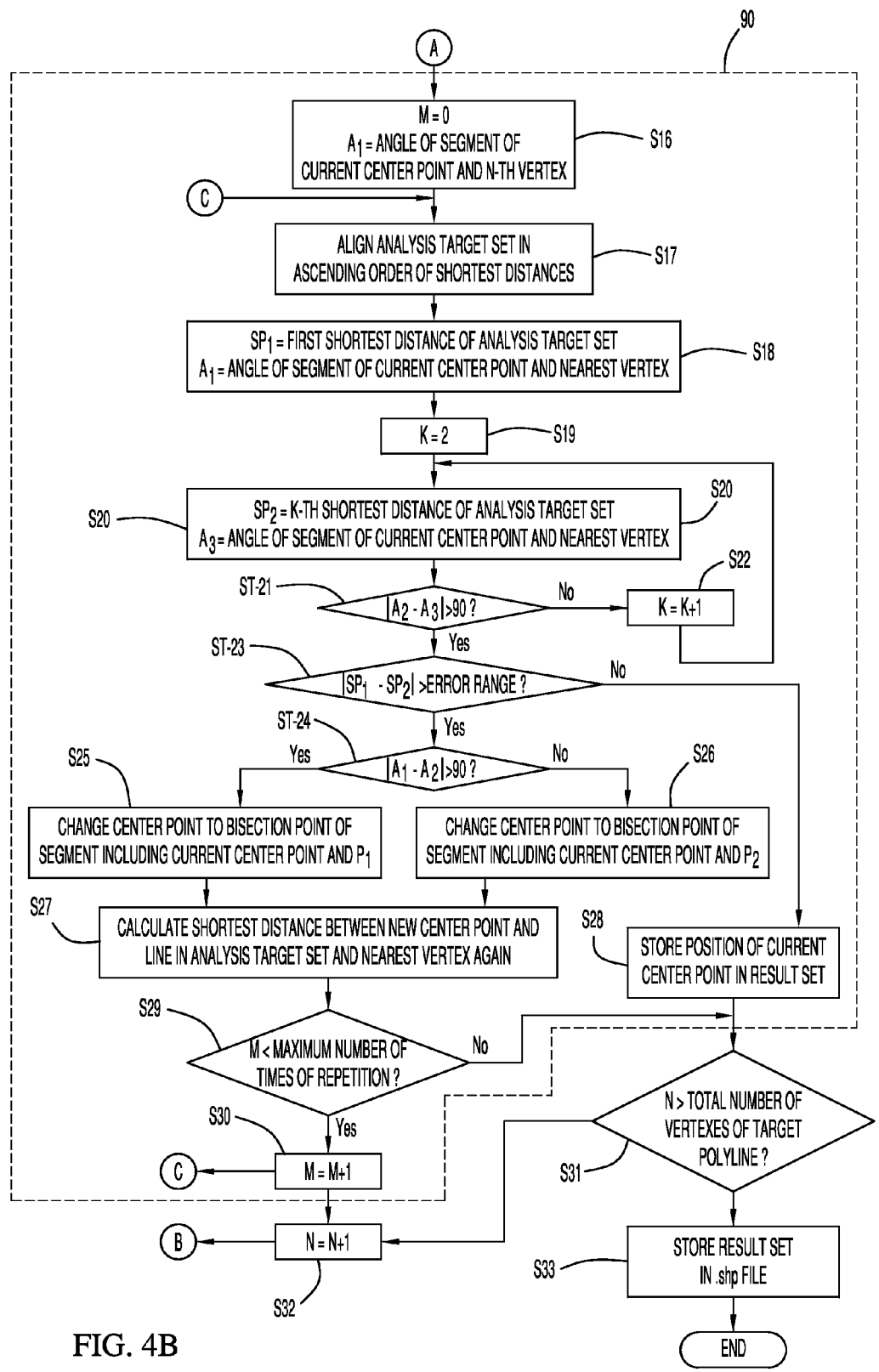

FIGS. 4A and 4B are flowcharts illustrating an algorithm for automatically detecting the positions of vertexes, through which the centerline passes, and storing the detection result, in the system for drawing the stream and road centerline for GIS-based linear map production according to the embodiment of the present invention.

Figure 10:
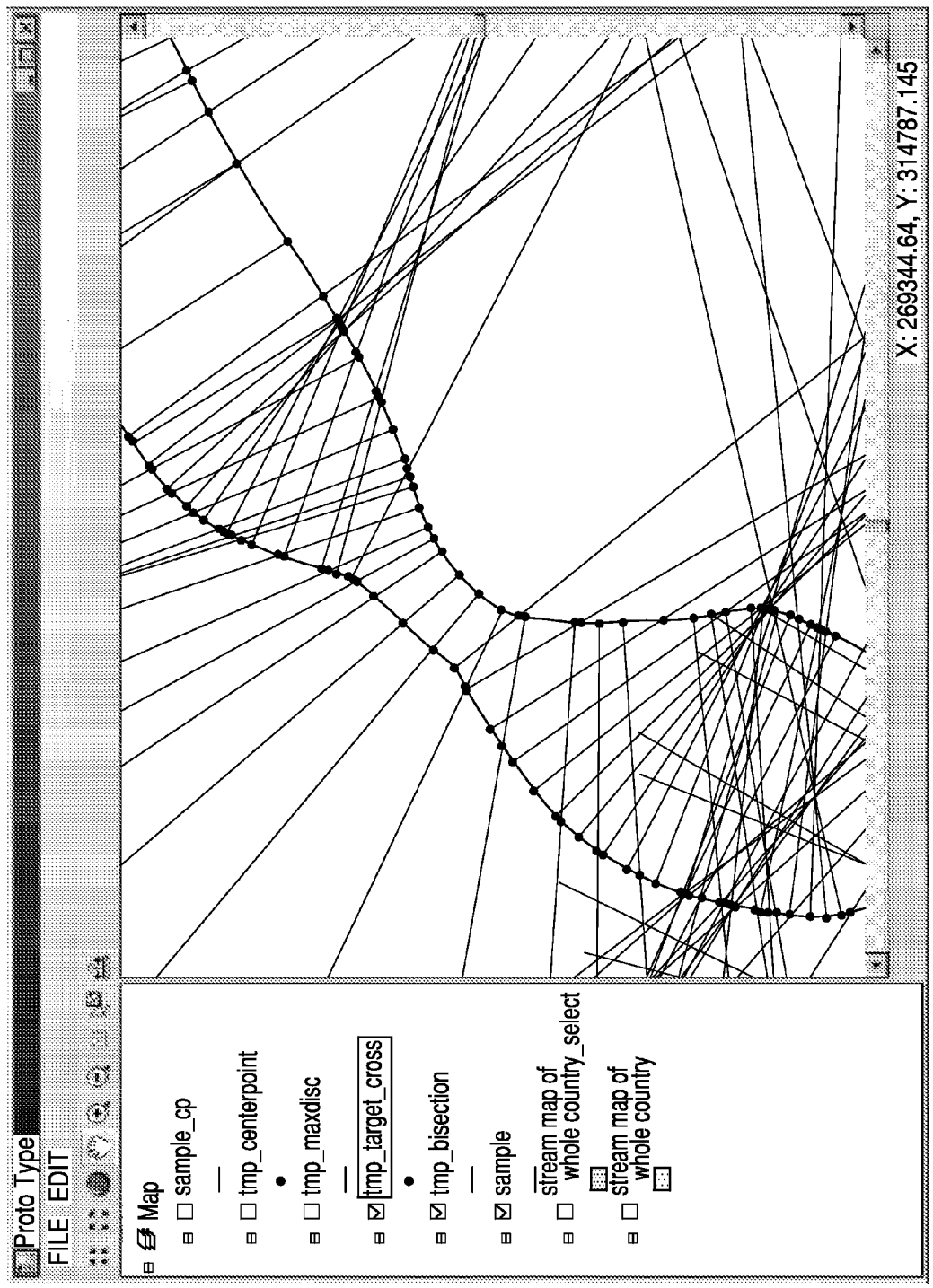
FIG. 10 is a diagram showing a result of generating a line bisecting an interior angle of a contour line vertex of a certain section and setting a detection section, in the system for drawing the stream and road centerline for GIS-based linear map production according to the embodiment of the present invention.

FIG. 10 is a diagram showing a result of generating a line bisecting a stream centerline direction angle (hereinafter, referred to as an interior angle) of angles between stream contour lines located on both sides of each contour line vertex of a certain section and setting a detection section in the system for drawing the stream and road centerline for GIS-based linear map production according to the embodiment of the present invention.

As shown in FIGS. 4A and 4B, a polygonal target section is transformed into a polyline in order to perform the centerline vertex position automatic detection procedure 42. As shown in FIG. 10, the line bisecting the interior angle is generated with respect to a contour line vertex of the result of transforming the target section from the polygon to the polyline and a new vertex is generated at a point intersecting an opposite contour line, thereby specifying a pair of vertexes.

The distance between the two vertexes is the diameter of an initial circle for calculating a maximum inscribed circle having a center point on the line bisecting the interior angle with respect to the contour line vertex.

Figure 11:
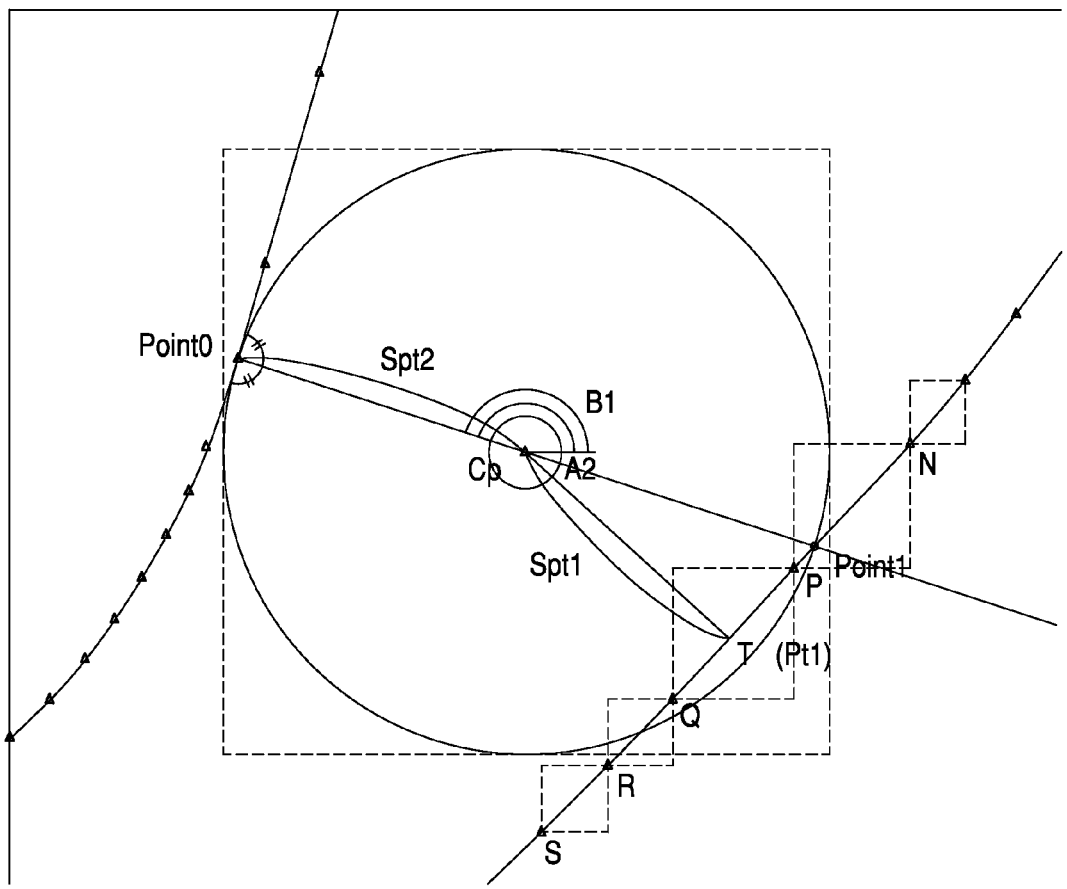
FIG. 11 is a diagram showing an initial detection state for detecting the positions of the vertexes, through which the centerline passes, with respect to an arbitrarily selected contour line vertex, in the system for drawing the stream and road centerline for GIS-based linear map production according to the embodiment of the present invention.

FIG. 11 is a diagram showing an initial detection state for detecting the positions of the vertexes, through which the centerline passes, with respect to an arbitrarily selected contour line vertex, in the system for drawing the stream and road centerline for GIS-based linear map production according to the embodiment of the present invention.

As shown in FIG. 11, a line bisecting an interior angle is generated at a certain vertex Point 0 of the target section, a point intersecting an opposite contour line is defined as Point 1, and a point bisecting the distance between the two vertexes is set to an initial center point of a maximum inscribed circle. The length of a segment for connecting Point 0 and Point 1 is the diameter of an initial circuit for calculating the maximum inscribed circle having the center point on the line bisecting the interior angle of the certain vertex.

As shown in FIGS. 4A and 4B, the algorithm includes two repetition procedures of each vertex of the target section. A first repetition portion 80 extracts an analysis target set to be used in a second repetition portion 90 for calculating the maximum inscribed circle having the center point located on the line bisecting the interior angle of the certain vertex. In the first repetition portion 80, a Minimum Enclosing Rectangle (MER) of the circle having the initial center point and the initial diameter is calculated, the calculation is repeated with respect to all the vertexes of the target section, an MER of a segment for connecting each vertex and a subsequent vertex is calculated, and a shortest distance between the segment for connecting each vertex and the subsequent vertex and the initial center point is calculated if the two MERs overlap.

If the calculated shortest distance is less than the initial radius, it is indicated that the contour line of the circle passes through the outside of the contour line of the target section. Therefore, as the analysis target for calculating the maximum inscribed circle, a set of the calculated shortest distance (e.g., Spt1 of FIG. 11), two vertexes (e.g., P and Q of FIG. 11) forming a segment which is currently being used to calculate the shortest distance and a vertex (e.g., T of FIG. 11) having a shortest distance from the initial center point on the segment which is currently being used to calculate the shortest distance is stored as an analysis target set. This process is performed with respect to all stream contour lines so as to generate the analysis target set such that the second repetition portion 90 calculates the maximum inscribed circle.

As shown in FIG. 11, it is assumed that the center point of the initial circle having the segment for connecting the vertex Point 0 of the stream contour line and Point 1, in which the line bisecting the interior angle at Point 0 intersects the opposite contour line thereof, as the diameter is Cp. At this time, an MER of the circle including the initial center point Cp and the initial diameter is calculated with respect to the vertexes N and P, an MER of a segment $\overline{NP}$ is calculated, and a determination as to whether or not the MERs intersect is made.

In the case where the MERs intersect, if a perpendicular line is drawn from Cp to a linear extension line of the segment $\overline{NP}$, an intersection point is not present on the segment $\overline{NP}$. Therefore, the shortest distance is the length of a segment $\overline{CpP}$ for connecting a nearest vertex P. In case of a segment $\overline{PQ}$, a perpendicular line generates an intersection point T on the segment $\overline{PQ}$, the shortest distance is the length of a segment $\overline{CpT}$. In contrast, in case of a segment $\overline{RS}$, an MER of the circle having the initial center point Cp and the initial diameter and an MER of the segment $\overline{RS}$ do not intersect, the shortest distance is not calculated.

Since the MER of the circle having the initial center point Cp and the initial diameter and the MER of the segment $\overline{PQ}$ intersect, the result of calculating the shortest distance is the length of the segment $\overline{CpT}$, which is less than the initial radius. Therefore, the coordinate of the vertex P, the coordinate of the vertex Q, the length of the shortest distance $\overline{CpT}$, and the coordinate of the vertex T which is the vertex of the segment $\overline{PQ}$ located at the nearest distance from the initial center point Cp are stored in the analysis target set as a small set. The other contour line vertexes are subjected to the above process so as to extract the analysis target set.

As shown in FIGS. 4A and 4B, the second repetition unit 90 detects the center of the maximum inscribed circle present on a segment $\overline{PointOption1}$ using the extracted analysis target set. Since the maximum inscribed circle touches the stream contour line at two or more points, a shortest distance and a second shortest distance are selected in the analysis target set and are adjusted to be equal to each other, thereby detecting the center point.

It is assumed that a smallest value of the shortest distances stored in the analysis target set is Spt1 and a nearest vertex of the stored small set is Pt1. As can be seen from FIG. 11, a smallest value of the shortest distances in the set is the length of the segment $\overline{CpT}$ and a second smallest value is the length of the segment $\overline{CpQ}$. However, if the distances between the center point Cp and the adjacent two vertexes such as the vertex T and the vertex Q are adjusted to be equal to each other, the number of points at which a target contour line touches a circle may be one or an inscribed circle smaller than the maximum inscribed circle may be generated.

Accordingly, in order to solve such a problem, the concept of an angle is introduced. At this time, an angle with a reference line in a direction of 3 o'clock is measured in a counterclockwise direction. An angle between the reference line and a segment $\overline{CpPt1}$ is 'A1, and a small set having a shortest distance of targets having a difference of more than 90° with the angle 'A1 is detected. In FIG. 11, an angle 'A2 is detected from the analysis target set. At this time, the length of a segment $\overline{CpPoint0}$ is denoted by Spt2. If a difference between Spt1 and Spt2 is greater than an error range, the coordinate of the current center point Cp needs to be adjusted and a bisection method is used in order to adjust the coordinate.

Since Spt1 is a shortest distance, the position of the center point Cp is moved to the opposite side of the shortest distance point Pt1 of Spt1 in order to increase the distance Spt1. If an angle between the reference line and the segment $\overline{CpPoint0}$ is 'B1, the opposite side of Pt1 is determined by comparing a difference between the angle 'A1 and the angle 'B1. If the difference between the angle 'A1 and the angle 'B1 is greater than 90°, the coordinate of vertex Point 1 is changed to the coordinate of the center point Cp and the coordinate of the center point Cp is changed to the coordinate of a point bisecting a segment $\overline{Point0Point1}$.

On the contrary, the coordinate of the vertex Point 0 is changed to the coordinate of the center point Cp and the coordinate of the center point Cp is changed to the coordinate of a point bisecting the segment $\overline{Point0Point1}$. Since the coordinate of the center point Cp is changed, the shortest distances of the segments included in the analysis target are also changed and thus are calculated again.

Figure 12:
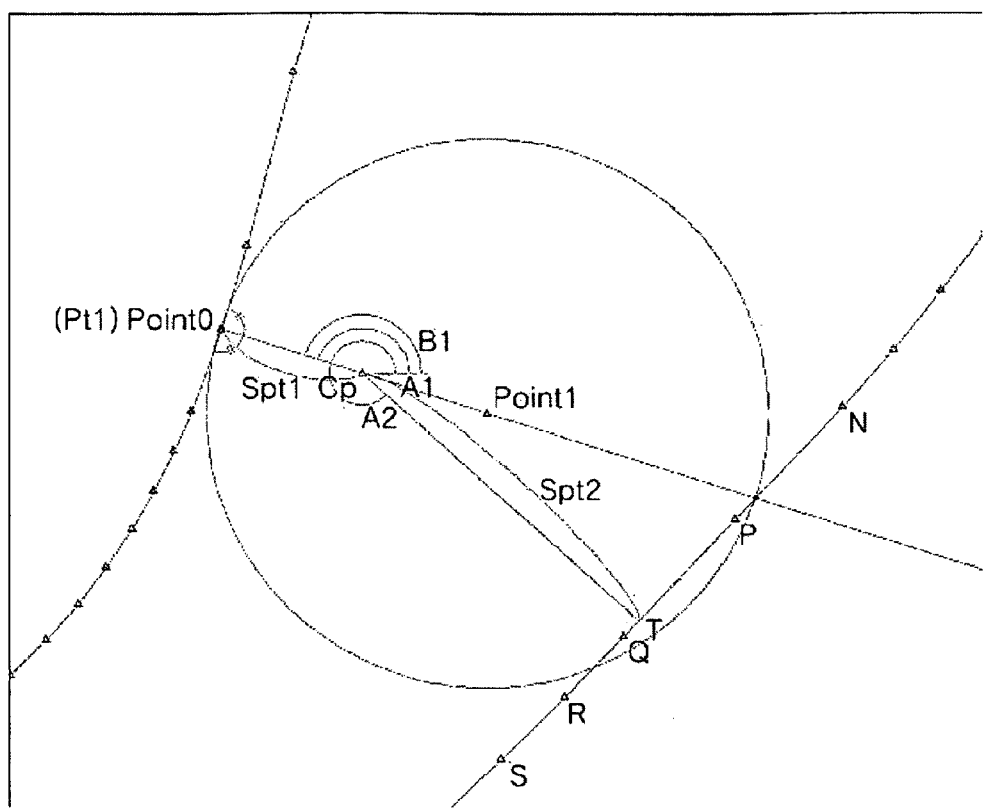
FIG. 12 is a diagram showing a result of performing a process of detecting the vertexes, through which the centerline passes, one time with respect to an arbitrarily selected contour line vertex, in the system for drawing the stream and road centerline for GIS-based linear map production according to the embodiment of the present invention.

FIG. 12 is a diagram showing a result of detecting the positions of the vertexes, through which the centerline passes, with respect to a certain section in the system for drawing the stream and road centerline for GIS-based linear map production according to the embodiment of the present invention.

Figure 13:
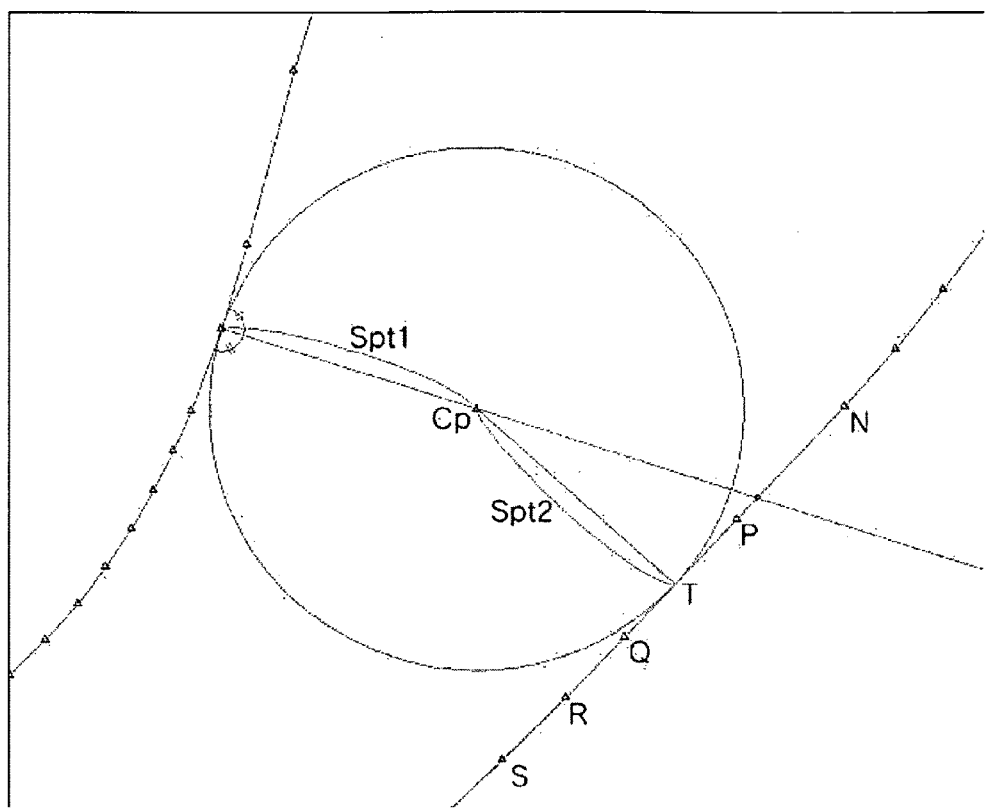
FIG. 13 is a diagram showing a final result of repeatedly performing the process of detecting the positions of the vertexes, through which the centerline passes, with respect to an arbitrarily selected contour line vertex in the system for drawing the stream and road centerline for GIS-based linear map production according to the embodiment of the present invention.

FIG. 13 is a diagram showing a final result of repeatedly performing the process of detecting the positions of the vertexes, through which the centerline passes, with respect to an arbitrarily selected contour line vertex in the system for drawing the stream and road centerline for GIS-based linear map production according to the embodiment of the present invention.

In the embodiment of the present invention, the result of performing first repetition of the second repetition portion 90 is shown in FIG. 12. If the difference between Spt1 and Spt2 is within the error range, the current center point Cp is set as the center of the maximum inscribed circle as shown in FIG. 13 and the repetition is stopped.

Figure 14:
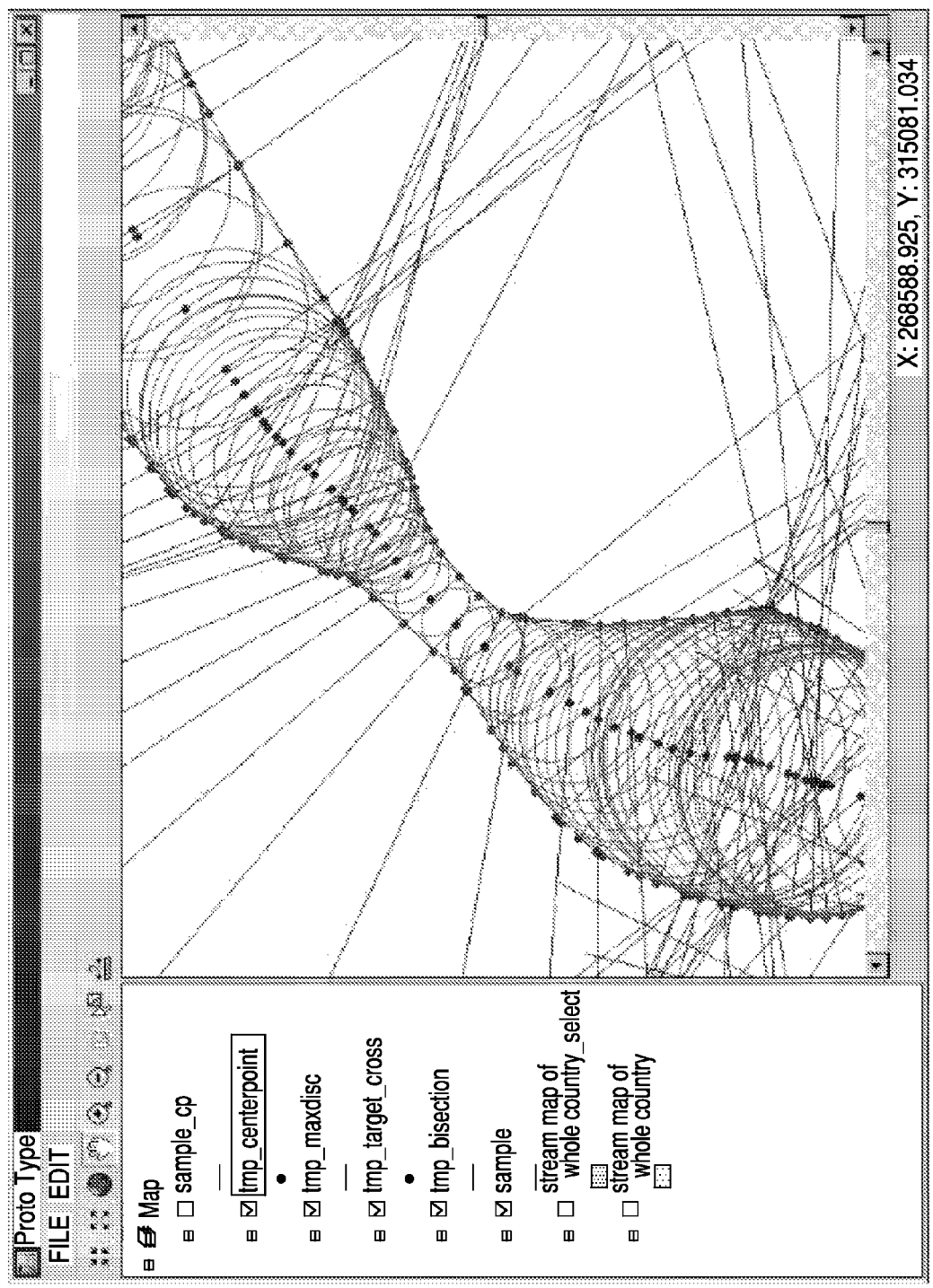
FIG. 14 is a diagram showing a result of detecting the positions of the vertexes, through which the centerline passes, with respect to a certain section, in the system for drawing the stream and road centerline for GIS-based linear map production according to the embodiment of the present invention.

FIG. 14 is a diagram showing a result of detecting the positions of the vertexes, through which the centerline passes, with respect to a certain section, in the system for drawing the stream and road centerline for GIS-based linear map production according to the embodiment of the present invention.

Referring to FIG. 14, an extracted vertex result storing procedure 43 is automatically performed after performing the centerline vertex position automatic detection procedure 42. The set of the positions of the vertexes, through which the centerline passes, which is the result of performing the centerline vertex position automatic detection procedure 42, is automatically stored in a shape file having a center point output file input through the input window of FIG. 9 as a file name.

Referring to FIG. 3, the process of connecting the potential vertexes included in the extracted centerline as the centerline is started by an extracted vertex result retrieving and environment setting procedure 51 in the centerline drawing, editing and storing module 50. The extracted vertex result retrieving and environment setting procedure 51 is performed by a simple menu window provided by the GUI. FIG. 7 shows an embodiment of an execution menu window in the system for performing the extracted vertex result retrieving and environment setting procedure.

As shown in FIG. 7, in the execution menu window for drawing the centerline in the system for drawing the stream and road centerline for GIS-based linear map production according to the embodiment of the present invention, centerline drawing is present as a menu for connecting the potential vertexes included in the extracted centerline as the centerline. A layer in which center point candidates extracted through centerline drawing are stored is selected so as to perform centerline drawing.

Figure 15:
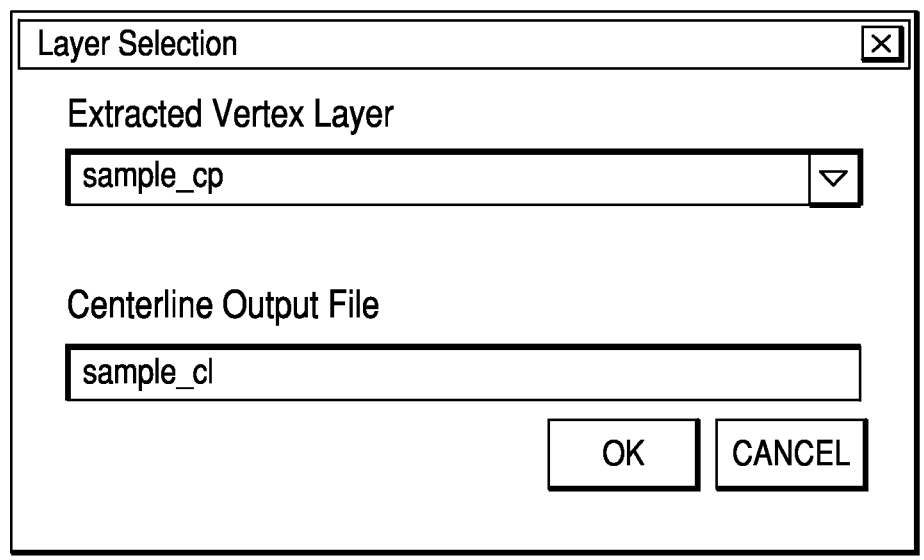
FIG. 15 is a diagram showing a name input window of a file, in which input data and the result of centerline drawing will be stored, in the system for drawing the stream and road centerline for GIS-based linear map production according to the embodiment of the present invention.

FIG. 15 is a diagram showing a name input window of a file, in which input data and the result of centerline drawing will be stored, in the system for drawing the stream and road centerline for GIS-based linear map production according to the embodiment of the present invention.

The input window of FIG. 15 includes a window for inputting a layer for storing the vertexes, through which the centerline passes, necessary to perform centerline drawing and a window for inputting the name of a file in which the result will be stored. If the input is completed, it is possible to confirm the result of performing the extracted vertex connection and the centerline editing 52 on a main screen.

Figure 5:
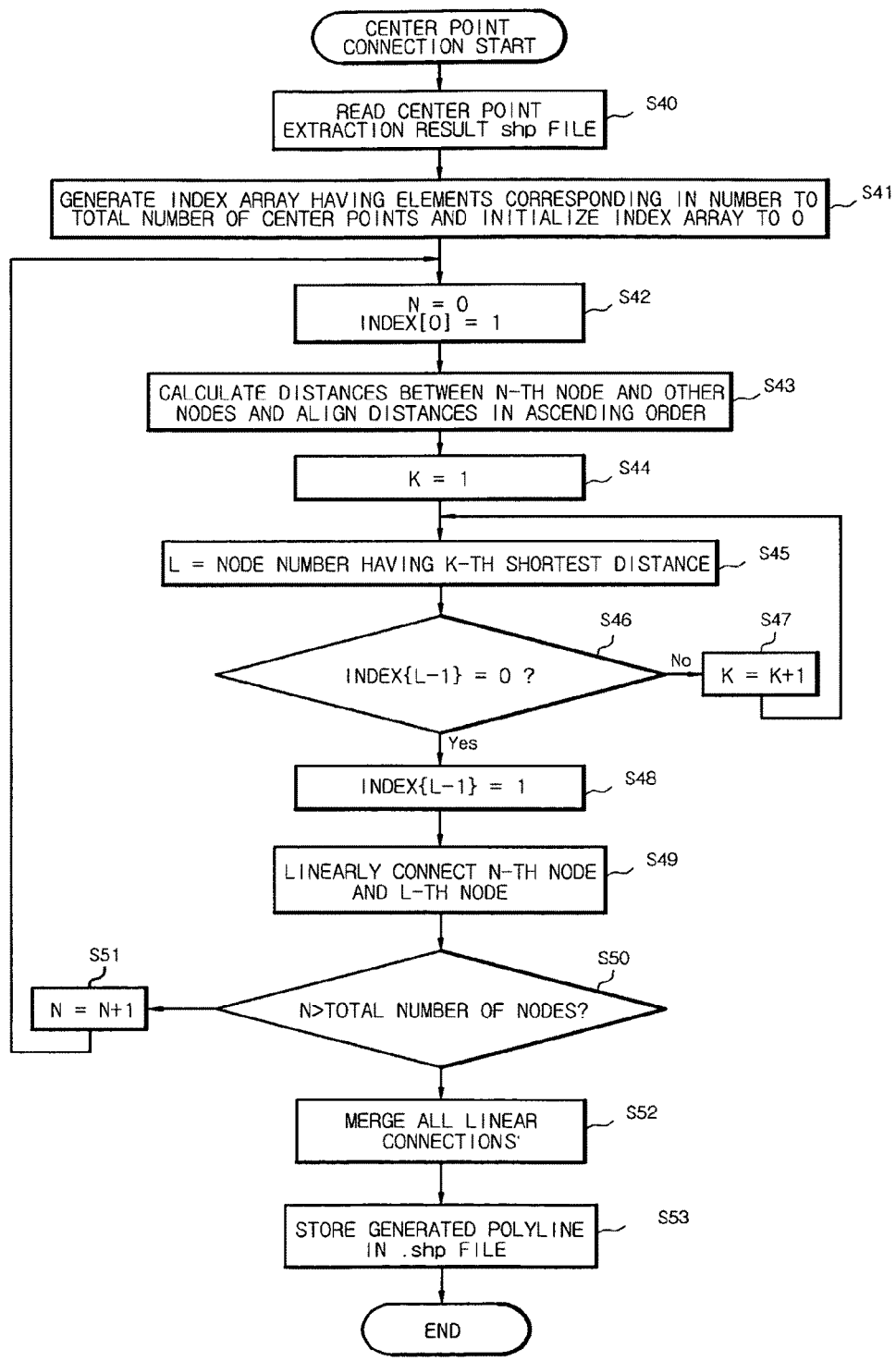
FIG. 5 is a flowchart illustrating an algorithm for connecting the stored vertexes so as to draw the centerline, in the system for drawing the stream and road centerline for GIS-based linear map production according to the embodiment of the present invention.

FIG. 5 is a flowchart illustrating an algorithm for connecting the stored vertexes so as to draw the centerline, in the system for drawing the stream and road centerline for GIS-based linear map production according to the embodiment of the present invention.

Figure 16:
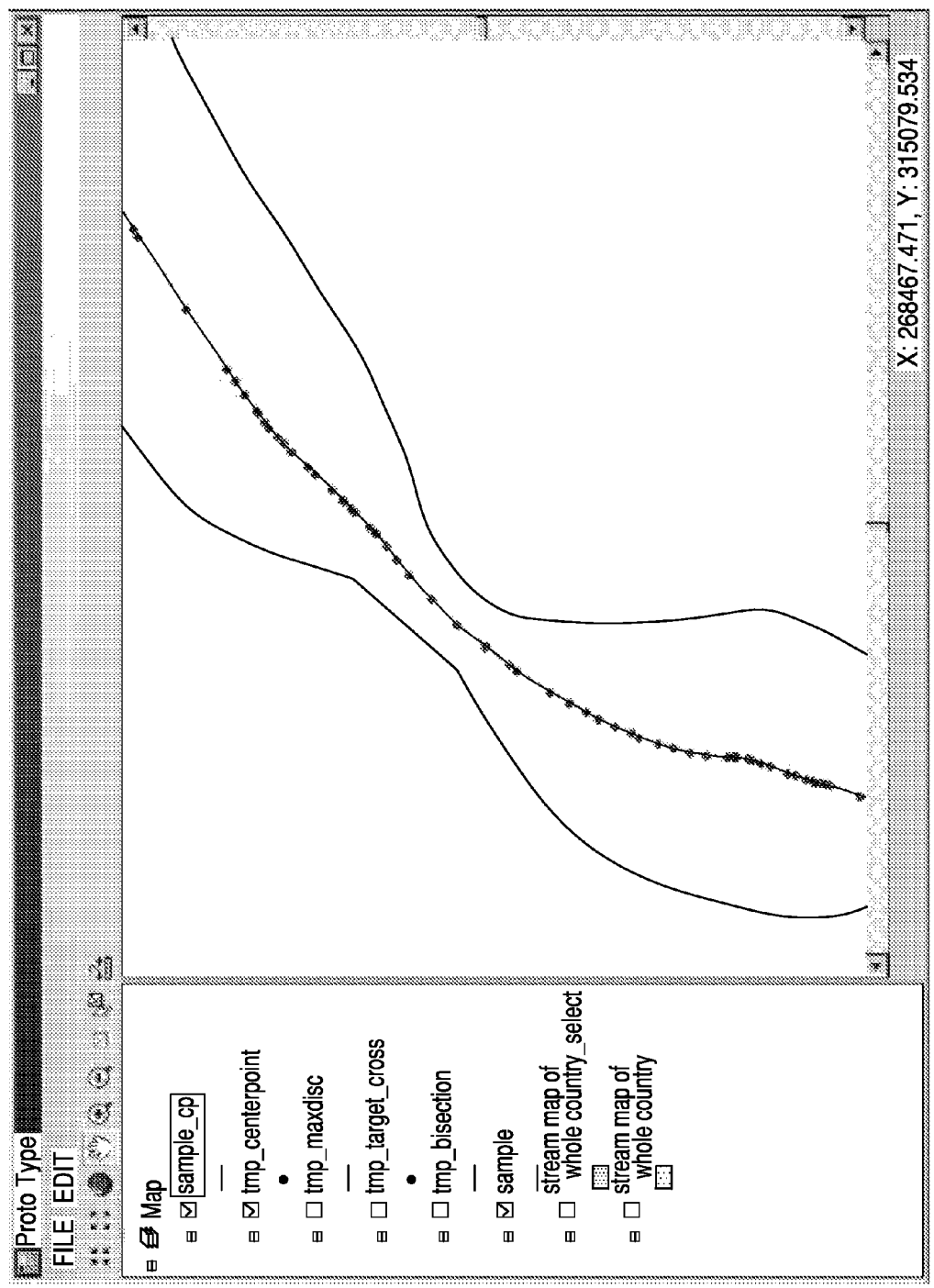
FIG. 16 is a diagram showing a result of connecting the centerline using the result of storing the positions of the vertexes, through which the centerline passes, with respect to a certain section, in the system for drawing the stream and road centerline for GIS-based linear map production according to the embodiment of the present invention.

FIG. 16 is a diagram showing a result of connecting the centerline using the result of storing the positions of the vertexes, through which the centerline passes, with respect to a certain section, in the system for drawing the stream and road centerline for GIS-based linear map production according to the embodiment of the present invention.

Figure 17:
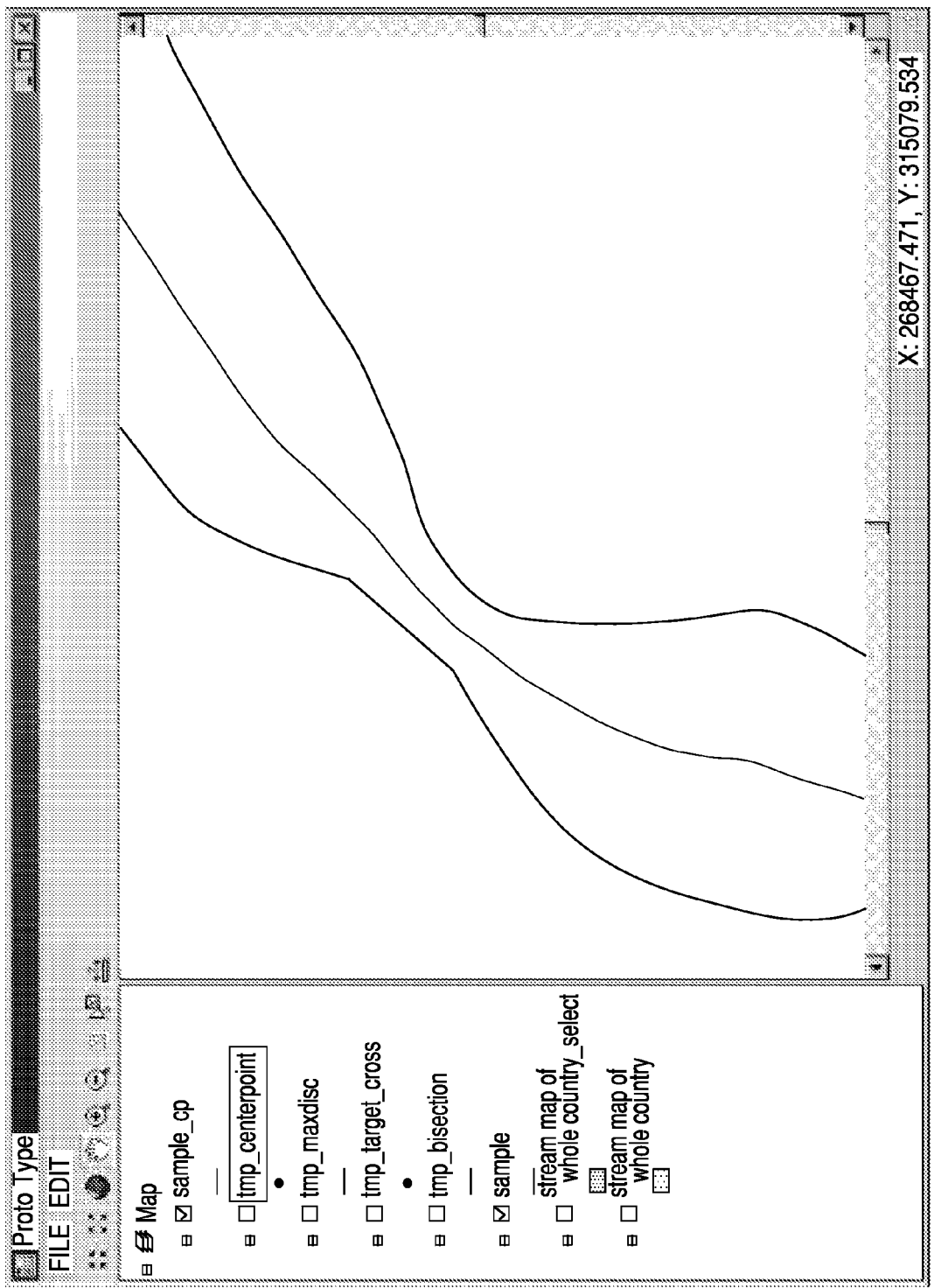
FIG. 17 is a diagram showing a final centerline which is drawn and stored in the system for drawing the stream and road centerline for GIS-based linear map production according to the embodiment of the present invention.

FIG. 17 is a diagram showing a final centerline which is drawn and stored in the system for drawing the stream and road centerline for GIS-based linear map production according to the embodiment of the present invention.

Referring to FIGS. 5, 16 and 17, in order to perform the extracted vertex result retrieving and environment setting procedure 51, the result of the centerline vertex position automatic detecting and storing module 40 is read. Thereafter, an extracted vertex connecting and centerline editing procedure 52 is performed by generating an index array having a size corresponding to the total number of vertexes, through which the centerline passes, initializing the index array to 0 and changing the array value of the vertexes selected for connecting the centerline to 1 so as to prevent overlapping selection, as shown in FIG. 5. Thereafter, if all the vertexes are connected, the result is stored in the file, in which the result of the input window shown in FIG. 15 will be stored, as the shape file.

Referring to FIG. 5, the distances from the vertexes, through which the centerline passes, to the other vertexes are calculated and a vertex having a shortest distance is connected therefrom. If the index array is referred to using the number of the vertex having the shortest distance and the value thereof is 0, a current vertex and a vertex having a shortest distance therefrom are connected by a line, and the value of the index array referred to using the number of the vertex having the shortest distance is changed to 1. Meanwhile, if the value of the index array referred to using the number of the vertex having the shortest distance is not 0, the vertex is regarded as a previously selected vertex, a vertex having a second shortest distance is detected and is connected by a line. After the above process is performed with respect to all the vertexes, generated segments are merged into one so as to generate one centerline polyline.

Referring to FIG. 17, the extracted vertex connecting and centerline editing procedure 52 is performed so as to obtain the result of connecting the vertexes, through which the centerline passes. The result of drawing the centerline is stored in the file, in which the result of the input result shown in FIG. 15 will be stored, as the shape file.

Figure 18:
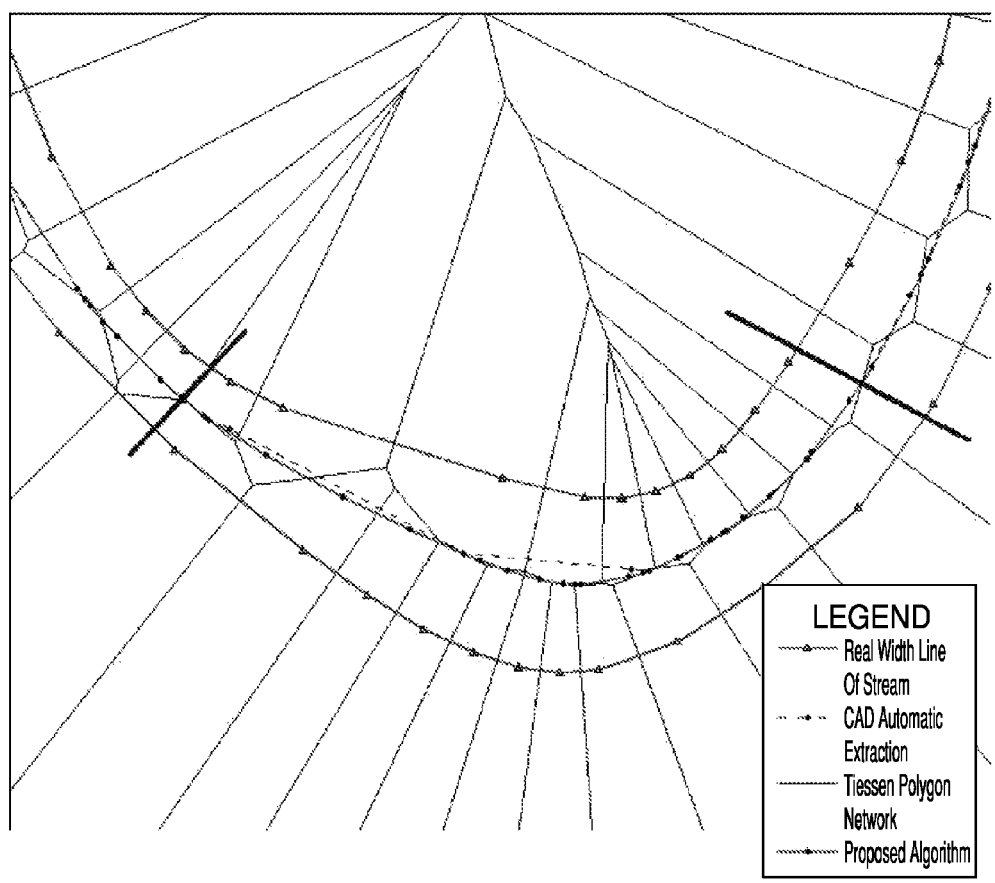
FIG. 18 is a diagram showing comparison between the result of drawing the centerline in the system for drawing the stream and road centerline for GIS-based linear map production according to the embodiment of the present invention, and a result of drawing a centerline by another method, with respect to a certain section having a curved portion.

FIG. 18 is a diagram showing comparison between the result of drawing the centerline in the system for drawing the stream and road centerline for GIS-based linear map production according to the embodiment of the present invention, and a result of drawing a centerline by another method, with respect to a certain section having a curved portion.

Figure 19:
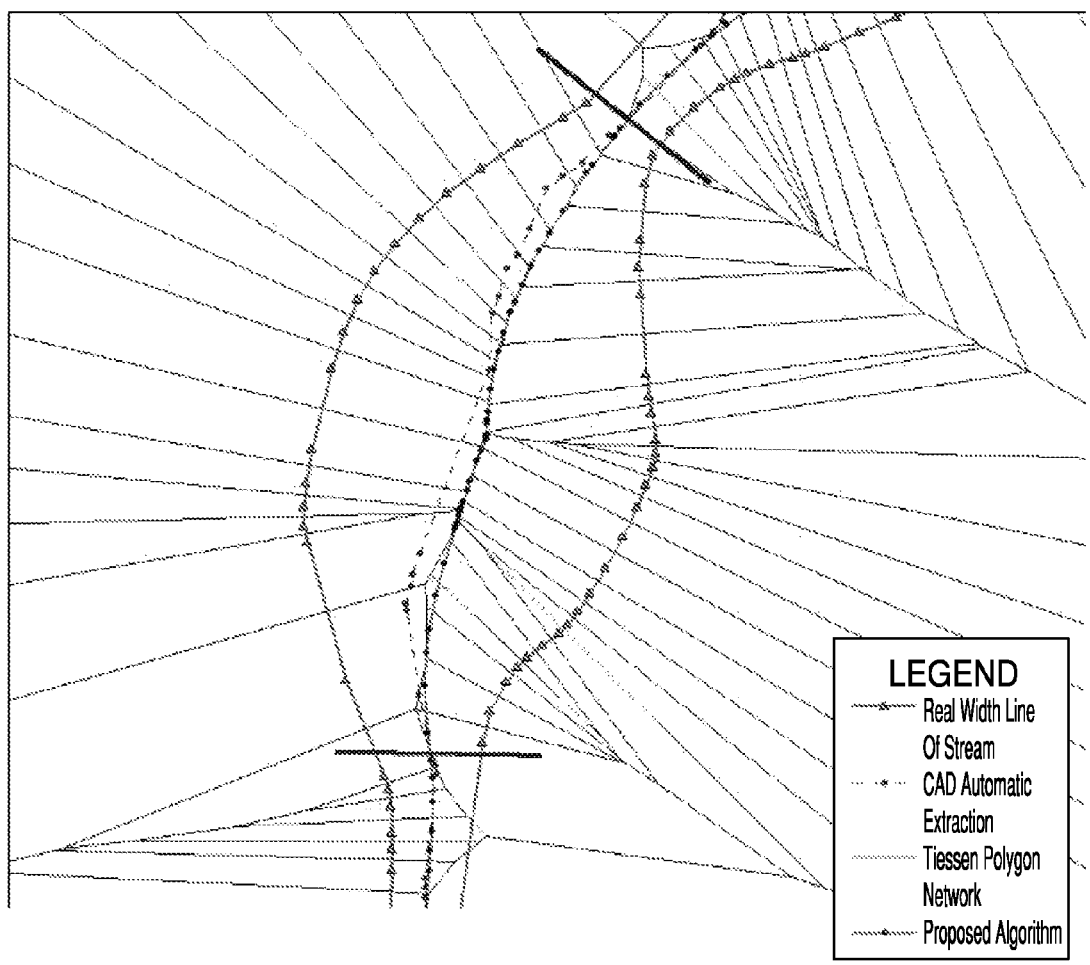
FIG. 19 is a diagram showing comparison between the result of drawing the centerline in the system for drawing the stream and road centerline for GIS-based linear map production according to the embodiment of the present invention, and a result of drawing a centerline by another method, with respect to a certain section having width variation.

FIG. 19 is a diagram showing comparison between the result of drawing the centerline in the system for drawing the stream and road centerline for GIS-based linear map production according to the embodiment of the present invention and a result of drawing a centerline by another method, with respect to a certain section with a width variation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for drawing a stream and road centerline based on a Geographic Information System (GIS), the system comprising:
   a system main module configured to drive the system for drawing the stream and road centerline necessary for accurate GIS-based linear map production;
   a spatial database in which a graphic database for storing a plurality of pieces of graphic data, in which positional information of points of a stream and road contour line is stored in the form of a digital map, is established;
   a centerline vertex position automatic detecting and storing module included in the system main module and configured to perform a preprocessing process of retrieving data of a region where centerline drawing is necessary, to automatically detect the positions of points, through which the centerline passes, and potential vertexes which will be included in the centerline in the future, and to extract and store the positional information of the points in the form of a digital map;
   a centerline drawing, editing and storing module included in the system main module and configured to draw and edit the centerline using the positional information of the vertexes processed by the centerline vertex position automatic detecting and storing module and to store the centerline as a linear map; and
   a display unit configured to display the result of drawing the centerline using the system on a screen,
   wherein the centerline vertex position automatic detecting and storing module performs the preprocessing procedure of retrieving a stream or road map stored in the spatial database and transforming the stream or road map into data available in the module, includes an algorithm for detecting a maximum inscribed circle of the points which are the positions of the potential vertexes of the centerline, and a center point of the maximum inscribed circle, transforms the extracted positional information of the potential vertexes into a digital map, and stores the digital map,
   wherein the centerline vertex position automatic detecting and storing module extracts all vertexes present on a contour line of the stream and road based on the GIS in order to accurately detect the positions of the potential vertexes of the centerline, generates a line bisecting an interior angle at a certain vertex point of the target section based on the vertexes of the contour line, defines a point intersecting an opposite contour line, sets a point bisecting the distance between the two vertexes to an initial center point of a maximum inscribed circle, sets the length of a segment connecting two vertexes to the diameter of an initial circle for calculating the maximum inscribed circle having the center point on the line bisecting the interior angle of a certain vertex, calculates a Minimum Enclosing Rectangle (MER) of the circle having the initial center point and the diameter of the initial circle, repeats the calculation with respect to all the vertexes of the target section, calculates an MER of a segment connecting each vertex and a subsequent vertex, and calculates a shortest distance between the segment connecting each vertex and the subsequent vertex and the initial center point if the two MERs overlap, wherein, as the calculated shortest distance less than the radius of the initial circle indicates that the contour line of the circle passes through the outside of the contour line of the target section, the centerline vertex position automatic detecting and storing module stores a set of the calculated shortest distance, two vertexes forming the segment which is currently being used to calculate the shortest distance and a vertex having a shortest distance from the initial center point on the segment, which is currently being used to calculate the shortest distance, in an analysis target set as an analysis target for calculating the maximum inscribed circle, generates the maximum inscribed circle, which touches the inside of the stream and road, from the analysis target set generated by performing the process with respect to all stream contour lines, and regards the position of a center point of the maximum inscribed circle as the position of a potential vertex included in the centerline so as to store positional information of all the vertexes, and wherein the centerline drawing, editing and storing module retrieves the vertexes extracted and stored by the centerline vertex position automatic detecting and storing module, performs snapping configuration for detecting the accurate positions of the vertexes based on the GIS and configuration for generating a new linear graphic, confirms and selects the positions of the vertexes extracted in a GIS-based environment, linearly connects and edits the vertexes, and stores the final result of connecting the centerlines as a linear digital map file.

2. A method for drawing a stream and road centerline based on a Geographic Information System (GIS), the method comprising:

extracting stream and road map data of a region when a selection signal for the region, map production of which is necessary, is applied;

transforming the map data into editable data;

detecting a maximum inscribed circle of points which are the positions of potential vertexes of a centerline and a center point thereof;

transforming positional information of the extracted potential vertexes into a digital map;

performing snapping configuration for finding the accurate positions of the vertexes and configuration for generating a new linear graphic based on a GIS;

linearly connecting the positions of the extracted vertexes and the centerline; and storing the final result of connecting the centerline as a linear digital map file, wherein the step of detecting includes:

extracting all vertexes present on a contour line of the stream and road based on the GIS in order to accurately detect the positions of the potential vertexes of the centerline;

generating a maximum inscribed circle, which touches the inside of the stream and road, based on the vertexes of the contour line;

generating a line bisecting an interior angle at a certain vertex point of the target section based on the vertexes of the contour line, defining a point intersecting an opposite contour line, setting a point bisecting the distance between the two vertexes to an initial center point of a maximum inscribed circle, and setting the length of a segment connecting two vertexes to the diameter of an initial circle for calculating the maximum inscribed circle having the center point on the line bisecting the interior angle of a certain vertex;

calculating a Minimum Enclosing Rectangle (MER) of the circle having the initial center point and the diameter of the initial circle, repeating the calculation with respect to all the vertexes of the target section, calculating an MER of a segment connecting each vertex and a subsequent vertex, and calculating a shortest distance between the segment connecting each vertex and the subsequent vertex and the initial center point if the two MERs overlap, as the calculated shortest distance less than the radius of the initial circle indicates that the contour line of the circle passes through the outside of the contour line of the target section, storing a set of the calculated shortest distance, two vertexes forming the segment which is currently being used to calculate the shortest distance and a vertex having a shortest distance from the initial center point on the segment, which is currently being used to calculate the shortest distance, in an analysis target set as an analysis target for calculating the maximum inscribed circle and performing the process with respect to all stream contour lines so as to generate the analysis target set; and generating the maximum inscribed circle, which touches the inside of the stream and road, from the generated analysis target set, and regarding the position of a center point of the maximum inscribed circle as the position of a potential vertex included in the centerline so as to store positional information of all the vertexes.

* * * * *